United States Patent
Rzehorska et al.

(10) Patent No.: US 8,549,903 B2
(45) Date of Patent: Oct. 8, 2013

(54) METHOD FOR TESTING A VEHICLE OR A SUB-SYSTEM THEREOF

(75) Inventors: Martin Rzehorska, Peggau (AT); Klaus Kutschi, Graz (AT); Rüdiger Teichmann, Hart bei Graz (AT); Roland Wanker, Hart bei Graz (AT)

(73) Assignee: AVL List GmbH, Graz (AT)

( * ) Notice: Subject to any disclaimer, the term of this patent is extended or adjusted under 35 U.S.C. 154(b) by 67 days.

(21) Appl. No.: 13/020,119

(22) Filed: Feb. 3, 2011

(65) Prior Publication Data

US 2011/0191079 A1 Aug. 4, 2011

(30) Foreign Application Priority Data

Feb. 4, 2010 (AT) .................................. GM 68/2010

(51) Int. Cl.
*G01M 15/00* (2006.01)
(52) U.S. Cl.
USPC ..................................... 73/116.06; 73/118.01
(58) Field of Classification Search
USPC ........................................ 73/116.06, 118.01
See application file for complete search history.

(56) References Cited

U.S. PATENT DOCUMENTS

| | | | |
|---|---|---|---|
| 5,307,290 A * | 4/1994 | Raviglione et al. | 701/29.2 |
| 7,104,118 B2 * | 9/2006 | Tentrup et al. | 73/116.06 |
| 8,001,835 B2 * | 8/2011 | Engstrom | 73/116.06 |
| 8,135,556 B2 * | 3/2012 | Fricke | 702/113 |
| 2004/0107082 A1 | 6/2004 | Sato et al. | |
| 2004/0255661 A1 | 12/2004 | Nagai et al. | |
| 2007/0260372 A1 * | 11/2007 | Langer | 701/29 |
| 2007/0260373 A1 * | 11/2007 | Langer et al. | 701/29 |
| 2007/0260438 A1 | 11/2007 | Langer et al. | |
| 2007/0275355 A1 | 11/2007 | Langer et al. | |
| 2010/0088058 A1 * | 4/2010 | Fricke | 702/113 |

FOREIGN PATENT DOCUMENTS

| | | |
|---|---|---|
| JP | 2004045122 A | 2/2004 |
| JP | 2004361292 A | 12/2004 |
| JP | 4266818 B2 | 5/2009 |
| JP | 2009536736 A | 10/2009 |
| KR | 20070027181 | 3/2007 |
| WO | WO2008047555 A1 | 4/2008 |

OTHER PUBLICATIONS

English Abstract of KR20070027181.
Lee, Jae-Cheon et al., "Hardware-in-the Loop Simulator for ABS/TCS," p. 652-657, Proceedings of the 1999 Institute of Electrical and Electronics Engineers, Int'l Conference on Control Applications, Kohala Coast Island of Hawaii, Hawaii, USA, Aug. 22-27, 1999.

* cited by examiner

*Primary Examiner* — Freddie Kirkland, III
(74) *Attorney, Agent, or Firm* — Dykema Gossett PLLC

(57) ABSTRACT

A method for testing a vehicle or a sub-system thereof on a test stand or in a road trial, wherein the method provides force and torque transmitting interfaces which are at least partially present in reality. To be able to further increase the flexibility of test runs or test drives, at least one further sub-system or one component which is not present in reality is reproduced independently of the interfaces via a simulation program which is supplied with real, actual measured values and/or signals of the real part, wherein the output signals of the simulation model are fed to a control device of the real part for further processing.

11 Claims, No Drawings

METHOD FOR TESTING A VEHICLE OR A SUB-SYSTEM THEREOF

BACKGROUND OF THE INVENTION a. Field of the Invention

The invention relates to a method for testing a vehicle or a sub-system thereof on a test stand or in a road trial, wherein the method provides force and torque transmitting interfaces which are at least partially present in reality.

b. Description of Related Art

In the development of vehicles, tests on test stands and also test drives on test tracks or during the real driving operation are of great importance. In the context of said tests and test drive, the flexibility is often increased by the use of simulations so that many possibilities are created to shorten development cycles and also to increase the product quality. Thus, software packages are available which simulate with detailed, substitutable system and component models the interaction between vehicle, driver, tires, road, traffic and environmental conditions. Also, in simulation systems, certain vehicle components are often modeled in detail.

BRIEF SUMMARY OF THE INVENTION

The object of the present invention was a method by means of which the flexibility of test runs or test drives can be further increased.

For solving said object, the method is characterized in that independently of said interfaces, at least one further sub-system or one component which is not present in reality can be reproduced via a simulation program which is supplied with real, actual measured values and/or signals of the real part, wherein the output signals of the simulation model are fed to a control device of the real part for further processing.

According to an advantageous embodiment it can further be provided that non-existing sensor functions are reproduced via a simulation model and the output signals of the simulation model are fed back as sensor values to the real part.

In order to be able to represent the reactions of the simulated sub-system or the simulated vehicle component, an advantageous variant of the invention provides that the output signals of the simulation model are fed to at least one actuator for influencing the real part.

Preferably, in this variant it is further provided that the reactions of the non-installed sub-system or the component which is not present in reality is simulated on the real system by at least one additional actuator, wherein the control values for said actuator or each actuator are determined from the output signals of the simulation model.

BRIEF DESCRIPTION OF THE SEVERAL VIEWS OF THE DRAWING(S)

Not Applicable

DETAILED DESCRIPTION OF THE INVENTION

In the following description, the invention is to be illustrated in more detail by means of examples.

The present invention is based on the use of computer aided simulation methods and simulation models which are used in real time or quasi-real time for example in a test vehicle. Different hardware components which are not installed in reality can now be integrated through simulation models in all possible embodiments and states into the real vehicle. In this manner, vehicles can be equipped by simulation with components such as particle filters, SCR catalytic converters, ammonia slip probes, lambda probes, NOx storage catalytic converters, etc.

As input variables, actual, physical measured values or data from one of the control devices of the vehicle are available for the simulation models. Sensor values can be obtained from the engine, drive train, transmission, GPS, exhaust gas, environment, acoustics, etc.

Of course, non-existing sensor functions can also be reproduced via a simulation model, and the output signals of the simulation models can be fed back as sensor values to the real vehicle. This comprises the simulation of sensor functions which are physically present or can be not present. By specifying defined error patterns or malfunctions, on the one hand, diagnostics on actuators is possible within on-board diagnostics (OBD). Also, the influence of defective components on development target values (e.g. influence of a defective intake manifold temperature sensor on the roller dynamometer test result) can be simulated at an early stage and with little effort.

On the other hand, the control devices supply data to the simulation, for example regarding driving condition, loading, regeneration coordinator, shifting mode, drivability, OBD, etc. The output signals of the simulation model in turn can be further processed in a control device of the real part or can serve as control variable for actuators so as to be able to represent reactions of the simulated sub-system or the simulated vehicle component. This can relate to actuators which are present in the real vehicle anyway or to actuators which are additionally installed within the context of the simulation trial. For example, for the physically representative simulation of a diesel particle filter which is not present in reality it is necessary to adjust the exhaust gas back pressure by means of an appropriate mechanical device.

The invention claimed is:

1. A method for testing a vehicle or a sub-system thereof on a test stand or in a road trial in which force and torque transmitting interfaces are present, characterized in that independently of said interfaces, simulating at least one of a further sub-system of the vehicle and a component of the vehicle using a simulation model which model is supplied with measured values and/or signals from the vehicle under test or a sub-system of the vehicle under test or a component of the vehicle under test, other than from the simulated sub-system or the simulated vehicle component, wherein output signals of the simulation model are fed to a control device of the vehicle under test or the sub-system of the vehicle under test or component of the vehicle under test, for further processing.

2. The method according to claim 1, wherein said simulated sub-system or component comprises a sensor, and wherein a sensor function is reproduced via the simulation model, and the output signals of the simulation model are fed back as sensor values to the control device.

3. The method according to claim 1, wherein the control device comprises an actuator, and wherein the output signals of the simulation model are fed to the actuator for influencing the vehicle or sub-system thereof or component thereof.

4. The method according to claim 3, wherein the simulated sub-system or component is comprises at least one additional actuator in the vehicle or sub-system thereof or component thereof, and, wherein control values for said at least one actuator are determined from the output signals of the simulation model.

5. The method according to claim 1, wherein the simulation model of the simulated sub-system or component is configured to selectively produce one of an error pattern and a malfunction, to thereby simulate the influence of a defective sub-system or component.

6. A method of testing a vehicle or a sub-system thereof or a component thereof, comprising:
   providing a vehicle in which force and torque transmitting interfaces are present;
   operating the vehicle in one of a test stand and a road test from which operation measured values and/or signals, defining first data, are obtained indicative of the operation of the vehicle;
   simulating one of (i) a sub-system of the vehicle being operated and (ii) a component of the vehicle being operated, using a simulation model, responsive to the first data and configured to produce output signals; and
   providing the output signals to a control device in the vehicle being operated, wherein said step of operating the vehicle further includes operating the control device in response to said output signals.

7. The method of claim 6 wherein the simulated subsystem or component comprises a simulated sensor, said method further comprising:
   reproducing a sensor function of the simulated sensor using the simulation model wherein the output signals include sensor values.

8. The method of claim 7 further comprising:
   feeding back the sensor values to the control device in the vehicle.

9. The method of claim 6 wherein the control device comprises an actuator, said method further comprising:
   operating the actuator based on the output signals for influencing the operation of the vehicle or sub-system thereof or component thereof.

10. The method of claim 9, wherein the simulated sub-system or component comprises at least one additional actuator in the vehicle or sub-system thereof or component thereof, said method further comprising:
    providing the at least one additional actuator with control values determined from the output signals of the simulation model.

11. The method according to claim 6, wherein the simulation model of the simulated sub-system or component is configured to selectively produce one of an error pattern and a malfunction, to thereby simulate the influence of a defective sub-system or component.

* * * * *

UNITED STATES PATENT AND TRADEMARK OFFICE
CERTIFICATE OF CORRECTION

PATENT NO. : 8,549,903 B2  Page 1 of 1
APPLICATION NO. : 13/020119
DATED : October 8, 2013
INVENTOR(S) : Rzehorska et al.

It is certified that error appears in the above-identified patent and that said Letters Patent is hereby corrected as shown below:

In the Claims:

Col. 2, line 45 (Claim 1), delete "," after the word --test--.

Signed and Sealed this
Seventeenth Day of December, 2013

Margaret A. Focarino
*Commissioner for Patents of the United States Patent and Trademark Office*